United States Patent [19]

Ogawa

[11] 4,398,222
[45] Aug. 9, 1983

[54] FACSIMILE APPARATUS

[75] Inventor: Mutsuo Ogawa, Yamato, Japan

[73] Assignee: Ricoh Company, Ltd., Tokyo, Japan

[21] Appl. No.: 201,906

[22] Filed: Oct. 29, 1980

[30] Foreign Application Priority Data

Nov. 8, 1979 [JP] Japan .................................. 54-143826
Nov. 8, 1979 [JP] Japan .................................. 54-143827

[51] Int. Cl.³ .............................................. H04N 1/04
[52] U.S. Cl. ..................................... 358/287; 358/257; 358/258; 358/296
[58] Field of Search .................. 358/287, 288, 77, 296, 358/257, 183, 256, 258; 364/515

[56] References Cited

U.S. PATENT DOCUMENTS 3,976,982  8/1976  Eiselen ................................ 358/287
4,163,605  8/1979  Yamada .............................. 358/287
4,255,766  3/1981  Matsuda et al. .................... 358/287

Primary Examiner—Robert L. Griffin
Assistant Examiner—Edward L. Coles
Attorney, Agent, or Firm—Oblon, Fisher, Spivak, McClelland & Maier

[57] ABSTRACT

A facsimile apparatus capable of transmitting and receiving image information, which is provided with an image information extraction apparatus for extracting the image information read by an image information read apparatus, at predetermined intervals, so that a monitor copy of the image information to be transmitted can be made, reduced in size in comparison with the size of the original document. The facsimile apparatus is further provided with an identification information generation apparatus for generating identification image information to be added to the image information, whereby a monitor copy with the identification information added to the image information, reduced in size in comparison with the size of the original, can be obtained.

8 Claims, 7 Drawing Figures

FACSIMILE APPARATUS

BACKGROUND OF THE INVENTION

The present invention relates to facsimile apparatus and more particularly to a facsimile apparatus suitable for obtaining monitor copies of image information transmitted.

In a conventional facsimile apparatus, in order to know, before transmission, in what state the image information to be transmitted will be received on the receiving side, or in order to keep a record on the transmission side of the image information transmitted, the image information for transmission is taken out from an image information output apparatus on the transmission side, such as a read apparatus or an image information storage apparatus in which the image information has been stored, before the image information is transmitted, so that the image information is recorded on record sheets in the form of monitor copies on the transmission side.

For instance, when the original document is a diazo blue copy or a photograph and it is desired to know beforehand in what state the image information appearing on the original document will be received by a facsimile apparatus on the reception side, the image quality of the image information that will be received by the facsimile apparatus on the reception side is checked, using a monitor copy. When the image quality, such as image contrast, is no good, the threshold level at the time of binary conversion of the image information is adjusted so as to improve the image quality.

Further, monitor copies can be used as a record of documents sent.

In a conventional facsimile apparatus, in order to obtain such monitor copies, the image information to be transmitted is input to a record apparatus on the transmission side and monitor copies of the same size as that of the original documents are made as described above.

Therefore, the conventional facsimile apparatus has a shortcoming in that it requires a large volume of record sheets for making such monitor copies. Further, since the monitor copies are of the same size as that of the original documents, much space is required for storing the monitor copies. Further, in the conventional monitor copies, only the image information appearing on original documents is recorded, usually without transmission date and address, and therefore the monitor copies are not always convenient for filing or later review.

SUMMARY OF THE INVENTION

It is therefore an object of the present invention to provide a facsimile apparatus from which the above-described drawbacks in the conventional facsimile apparatus have been successfully eliminated and which is capable of reducing the consumption of record sheets for monitor copies in comparison with the conventional facimile apparatus, facilitating storage of monitor copies.

Another object of the present invention is to provide a facsimile apparatus of the above-mentioned type, particularly capable of producing monitor copies suitable for filing or later review.

According to the present invention, the image information which is output from an image information output apparatus, such as a read apparatus or an image information storage apparatus, is extracted by an image information extraction apparatus, to be explained, and reduced in size in comparison with the size of the original documents, and is then recorded on monitor copies. Therefore, monitor copies reduced in size can be obtained. Accordingly, the consumption of record sheets for the monitor copies can be reduced and the monitor copies will not require as much space for the storage of them.

Further, according to the present invention, the image information output from the image information, output apparatus, and the image information output from an identification information generation apparatus are output separately and extracted by the image information extraction apparatus for recording. Therefore, monitor copies with identification information containing, for instance, transmission time, address and other necessary codes, can be obtained, which are likewise reduced in size. Therefore, filing of the monitor copies and later review thereof are significantly facilitated.

DETAILED DESCRIPTION OF THE PREFERRED EMBODIMENT

Figure 1:
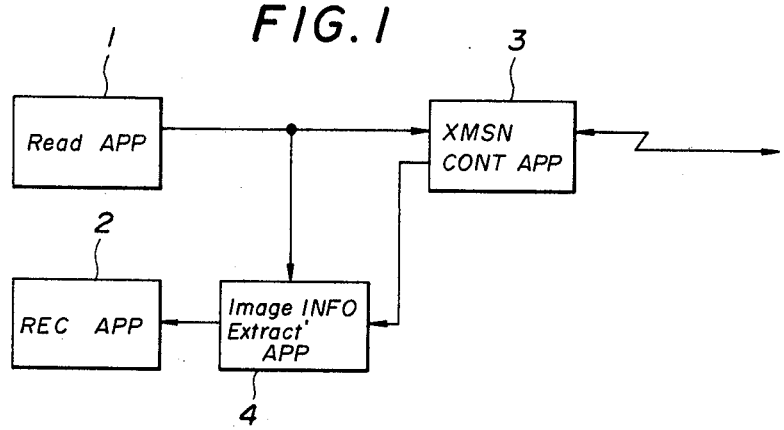
FIG. 1 is a block diagram of an embodiment of a facsimile apparatus according to the present invention.

Referring to FIG. 1, there is shown a block diagram of an embodiment of a facsimile apparatus according to the present invention. In the figure, reference numeral 1 represents a read apparatus. Reference numeral 2 represents a record apparatus. Reference numeral 3 represents a transmission control apparatus. As those apparatuses, such conventional apparatuses as are disclosed in U.S. Pat. No. 3,916,095 issued to the applicant of the present application and in the copending U.S. patent application Ser. No. 80-164466 filed on June 30, 1980 now U.S. Pat. No. 4,297,727 by the same applicant can be employed. The read apparatus 1 performs main scanning and subscanning of an original document, outputting successively therefrom the image information appearing on the original document. The record apparatus 2 performs successive recording on a record sheet of the image information from the main scanning and subscanning. The transmission control apparatus 3 performs coding of the image information, which is output from the read apparatus 1, and then outputs compressed data of the image information to a telephone line, while recording compressed data received, converting the same to original image information by expanding the compressed data and then outputting the same to the record apparatus 2.

The embodiment of a facsimile apparatus in FIG. 1 is characterized in that image information output from the transmission control apparatus 3 is directly output to the record apparatus 2 and in that an image information extraction apparatus 4 is provided, which cuts out the image information input thereto at predetermined intervals both in the main scanning direction and the subscanning direction, and outputs reduced image information therefrom.

In the thus constructed facsimile apparatus, transmission and reception of image information are performed in the conventional way.

In this embodiment, when an original document is read by the read apparatus 1 and the image information of the original document is output from the read apparatus 1, the image information is extracted in the main scanning direction and/or subscanning direction with predetermined intervals by the image information extraction apparatus 4 and is then input successively to the record apparatus 2.

The record apparatus 2 records successively the image information input thereto and monitor copies reduced in size in comparison with the original documents are obtained. For example, when the image information is extracted, with alternate bits eliminated, the monitor copy is reduced to ¼ the size of the original document, and when the image information is extracted by eliminating two bits out of every three bits in both scanning directions, the monitor copy is reduced to 1/9 the size of the original document.

Figure 2:
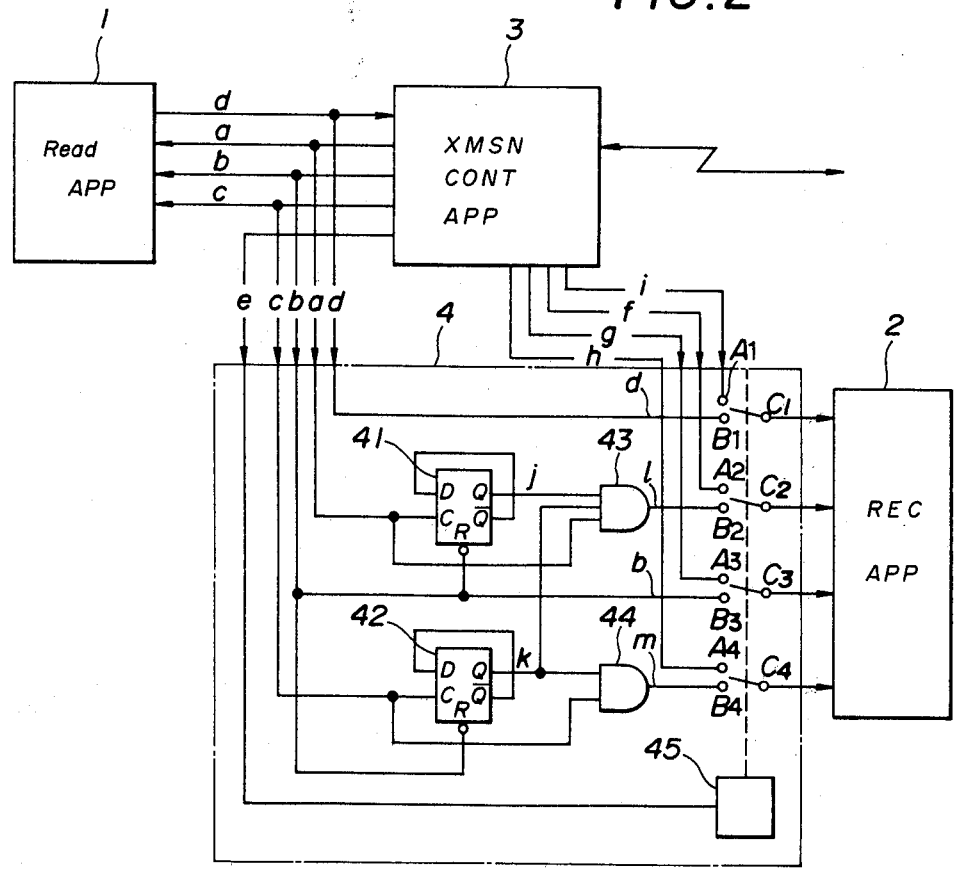
FIG. 2 is an example of a circuit diagram for the embodiment in FIG. 1.

Referring to FIG. 2, there is shown an example of a circuit diagram for the embodiment for reducing the monitor copy to ¼ the size of the original document. In the figure, the same reference numerals as those in FIG. 1 represent the same or substantially the same parts as those in FIG. 1.

At transmission, a main scanning clock a, a line synchronization signal b, a subscanning clock c and a transmission mode signal e are output from the transmission control apparatus 3.

This facsimile apparatus is constructed in such a manner that the transmission mode signal e is output from the transmission control apparatus 3 when the facsimile apparatus is operated under transmission mode, for example, by the operator, although its specific construction is not shown in FIG. 2.

In the read apparatus 1, the main scanning and subscanning are performed in synchronization with the main scanning clock a and the subscanning clock c, which are output from the transmission control apparatus 3. As a result, image information d for each line is output from the read apparatus 1 in synchronization with the main scanning clock a, in accordance with the input of the line synchronization signal b to the read apparatus 1. The image information is subjected to data compression by the transmission control apparatus 3 when necessary and is then output to the telephone line.

In general, the image information d is in the form of a binary signal. However, as the image information d, a signal capable of making a half-tone reproduction can be employed.

At reception, data received by the facsimile apparatus is decoded by the transmission control apparatus 3 and is then expanded to image information i corresponding to each original line information and, at the same time, a main scanning block f, a line synchronization signal g and a subscanning clock h are output from the transmission control apparatus 3.

The image information extraction apparatus 4, which receives the signals a, b, c, d, e, f, g, h and i and outputs them to the record apparatus 2, comprises flip-flops 41 and 42, AND gates 43 and 44, and a signal switching relay 45, which are connected to each other as shown in FIG. 2.

The operation of the image information thin-out apparatus 4 will now be explained.

At transmission, the signal-switching relay 45 connects common terminals $C_1$ to $C_4$ to switching terminals $B_1$ to $B_4$ in accordance with the transmission mode signal e which is output from the transmission control apparatus 3.

By the line synchronization signal b which is input to the image information extraction apparatus 4, the flip-flops 41 and 42 are reset in such a manner that the extraction positions in the main scanning and subscanning directions are predetermined as will be explained in detail below.

The main scanning clock a and the subscanning clock c, which are input after the line synchronization signal b, are respectively reduced to ½ by the flip-flops 41 and 42 and are then output therefrom.

Therefore, to the gate 43, there are input the main scanning clock a, a one-half output j of the main scanning clock a, and a one-half output k of the subscanning clock c. As a result, a main scanning clock l is output from the gate 43, with alternate bits eliminated in the main scanning direction and alternate lines eliminated in the subscanning direction.

On the other hand, a subscanning clock m is output from gate 44, with alternate bits eliminated in the subscanning direction, by the subscanning clock c and the one-half output k of the subscanning clock c input to the gate 44.

As mentioned previously, since the flip-flops 41 and 42 are reset by each line synchronization signal b input thereto, the main scanning clock l output from the gate 43 and the subscanning clock m output from the gate 44 work as clocks which are output at the timing of being positioned, with alternate bits eliminated, always starting from the head of the main scanning clock a and that of the subscanning clock c.

Therefore, to the record apparatus 2, there are input the image information d which is in synchronization with the main scanning clock a; the main scanning clock l which is obtained, with alternate bits eliminated, from the main scanning clock a; the line synchronization signal b; and the subscanning clock m which is obtained, with alternate bits eliminated, from the subscanning clock c.

Figure 3:
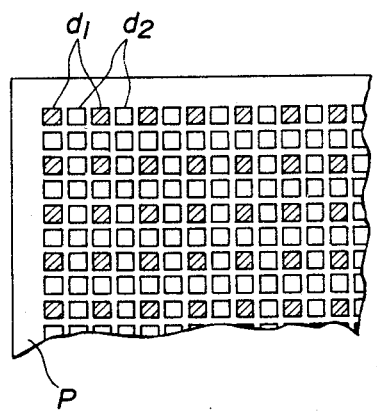
FIG. 3 is a partial view of image information appearing on an original document.
Figure 4:
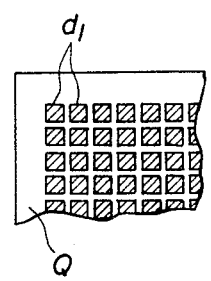
FIG. 4 is a partial view of image information recorded on a record sheet.

In the record apparatus 2, main scanning and subscanning are performed in accordance with the main scanning clock l and the subscanning clock m, so that the image information d output from the read apparatus 1 is recorded with alternate bits eliminated, in the main scanning direction and the subscanning direction, respectively, in accordance with the line synchronization signal b. As a result, as shown in FIG. 3, image information, $d_1$ and $d_2$, appearing on an original document p, are extracted, with alternate bits eliminated, both in the main scanning direction and the subscanning direction, so that only the image information $d_1$ is recorded on a record sheet Q as shown in FIG. 4. In FIG. 4, the image information $d_1$ is shown by shading. Thus, a monitor copy which is reduced in size to ¼ the original is obtained.

On the other hand, at reception, the common terminals $C_1$ and $C_4$ are connected to switching terminals $A_1$ to $A_4$ by the signal-switching relay 45, so that the image information i, the main scanning clock f, the line synchronization signal g and the subscanning clock h, which are output from the transmission control apparatus 3, are directly input to the record apparatus 2. As a result, a copy of the same size as that of the original document on the transmission side can be obtained.

In the above-mentioned embodiment, when monitor copies of the same size as that of the originals are desired at transmission, they can be obtained by setting the signal-switching relay 45 to the above-mentioned reception position, thereby outputting the image information d, which is output from the read apparatus 1, from the transmission control apparatus 3.

Figure 5:
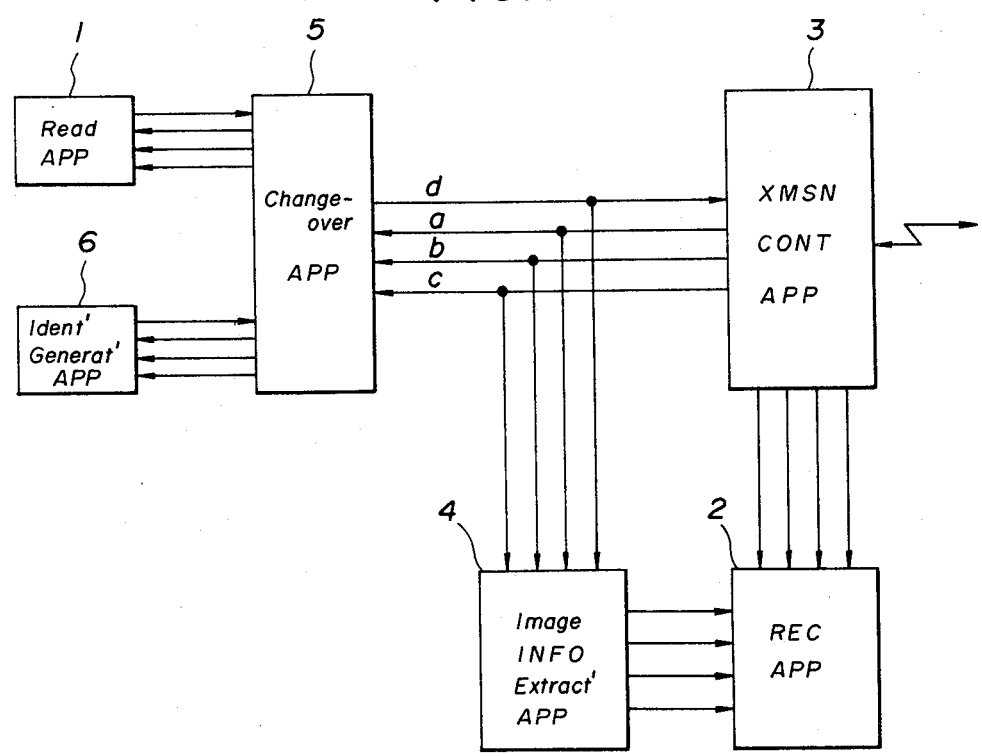
FIG. 5 is a block diagram of another embodiment of a facsimile apparatus according to the present invention.

Referring to FIG. 5, there is shown a block diagram of another embodiment of a facsimile apparatus according to the present invention. In the figure, the read apparatus 1, the record apparatus 2, the transmission control apparatus 3 and the image information extraction apparatus 4 are the same as those first-mentioned in the embodiment that has been explained by referring to FIG. 1 to FIG. 4.

The key features of this embodiment are that an identification information generation apparatus 6 for generating identification information, such as transmission time, reception address code and original document number, which are usually not described on the original document, is added to the first-mentioned embodiment, and that, via a change-over apparatus 5, the identification information is added to the image information which is output from the read apparatus 1, so that the image information and the identification information, which are output from the change-over apparatus 5, are input to the record apparatus 2, with both types of image information extracted in the main scanning direction and/or the subscanning direction.

The transmission and reception operations of the thus constructed facsimile apparatus are the same as those of the conventional facsimile apparatus.

At the reading of the original document, the image information generated from the read apparatus 1 and the identification information generated from the identification generation apparatus 6 are thinned out at predetermined intervals in the main scanning direction and/or in the subscanning direction by the image information thin-out apparatus 6 and are then input successively to the record apparatus 2.

As a result, a monitor copy reduced in size, to which the identification information has been added, is obtained by the successive recording operation of the record apparatus 2. For example, when image information is extracted, with alternate bits eliminated, in both the main scanning direction and the subscanning direction by the image information extraction apparatus 4, a monitor copy having the identification information, reduced in size to ¼ the original is obtained, while when image information is extracted by eliminating two bits of every three in both the main scanning direction and the subscanning direction, a monitor copy having the identification information, reduced in size to 1/9 the original, is obtained.

Figure 6:
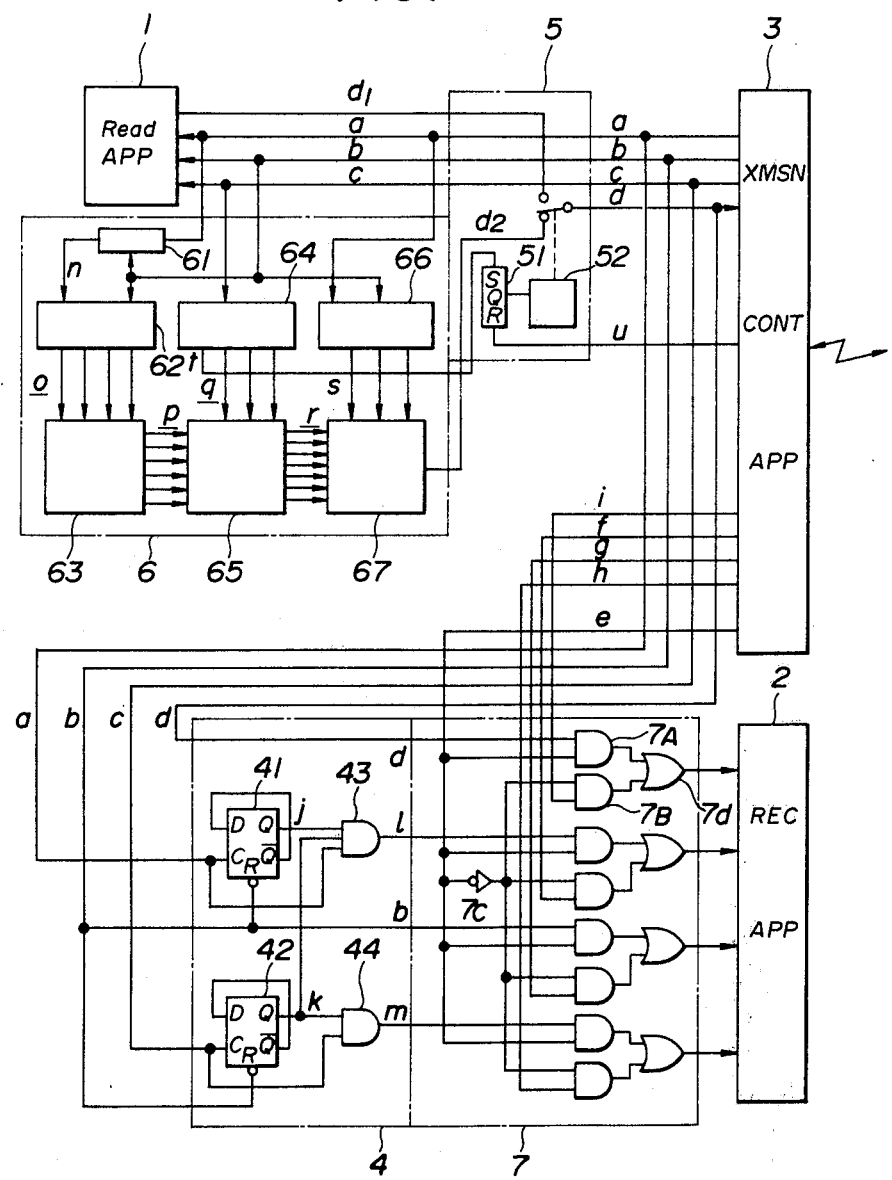
FIG. 6 is an example of a circuit diagram for the embodiment in FIG. 5.

Referring to FIG. 6, there is shown an example of a circuit diagram of an embodiment for obtaining a monitor copy having identification information, which is reduced in size to ¼ the original document. In the figure, the same reference numerals as those in FIG. 5 represent the same or substantially the same parts as those in FIG. 5.

Figure 7:
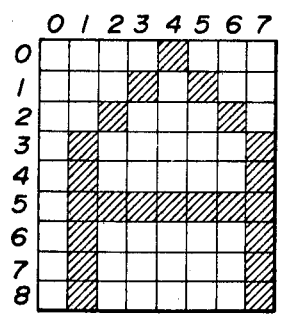
FIG. 7 is an example of a character pattern diagram of a character which is generated from an identification information generation apparatus.

The identification information generation apparatus 6 comprises a counter 61 which counts the main scanning clock a output from the transmission control apparatus 3, generating a pulse n each time 8 bits, for example, have been counted, and which is reset by the line synchronization signal b; a character counter 62 which counts the pulse n output from the counter 61 and outputs a character address signal 63 in which a plurality of character codes is stored and which outputs a character code p designated by the character address signal o which is output from the character counter 62; a line counter 64 which counts the subscanning clock c and outputs a line direction address signal q successively and which outputs a set signal t by the next subscanning clock e after 8 bits, for example, of the subscanning clock c have been counted; a character pattern generator 65 which generates a character pattern, for example, of 8×9 bits as shown in FIG. 7, in accordance with the character code p output from the character memory 63, and which outputs data r of 8 bits of the line designated by the line address signal q which is output from the line counter 64; a bit counter 66 which counts the main scanning clock a and outputs a main-scanning-direction bit address signal s, and which is reset by the line synchronization signal b; and a multiplexer 67 which outputs successively the data r of 8 bits in the line direction, bit by bit, which is output from the character pattern generator 65, in accordance with the bit address signal s which is output from the bit counter 66.

The change-over apparatus 5 comprises a flip-flop 51 which is reset by a reset signal u output from the transmission control apparatus 3 and which is set by the set signal t output from the line counter 64, and a relay apparatus 52 which is energized by the set output of the flip-flop 51 and which changes over a relay contact to the state as shown in FIG. 6.

Reference numeral 7 represents a signal selection apparatus which selects an AND gate 7A by the mode signal e under transmission mode, applying the image information d, the main scanning clock l, the line synchronization signal b, and the subscanning clock m, which are output from the image information thin-out apparatus 4, to the record apparatus 2 via an OR gate 7d, and which selects an AND gate 7B via a NOT circuit 7c under reception mode, applying the image information i, the main scanning clock f, the line synchronization signal g, and the subscanning clock h, which are output from the transmission control apparatus 3, to the record apparatus 2. The signal selection apparatus 7 can be disposed within the record apparatus 2.

The operation of the signal selection apparatus 7 will now be explained.

Under transmission mode, the counters in the identification information generation apparatus 6 are reset in their respective initial states.

The flip-flop 51 of the change-over apparatus 5 is reset and the relay contact of the relay apparatus 52 is switched as shown in FIG. 6. Furthermore, the signal selection apparatus 7 selects the signals d, l, b and m in accordance with the mode signal e and is ready for outputting them.

The character memory 63 outputs the character code p which is designated in accordance with the output value o from the character counter 62. Consequently, a character pattern as shown in FIG. 7, which corresponds to the character code p, is formed in the character pattern generator 65. Further, data r for 8 bits in the main scanning direction at the 0th line, which is designated by the output value q of the line counter 64, is output from the pattern generator 65 to the multiplexer 67.

When the main scanning clock a is output from the transmission control apparatus 3 after the output of the line synchronization signal b, the bit counter 66 counts the main scanning clock a successively, changing the main-scanning-direction address. As a result, the multiplexer 67 outputs successively, one bit by one bit, the previously taken out image information d of 8 bits at the 0th line in FIG. 7.

When the image information of 8 bits at the 0th line in the character pattern has been completely output, the counter 61 outputs the pulse n. The character counter 62 counts the pulse n and changes the address. As a result, the next character code p is output from the character memory 63, so that the character pattern r corresponding to the character code p is generated in the character pattern generator 65. In the same manner as mentioned above, the image information of 8 bits at the 0th line in the character pattern r is output, one bit by one bit, from the multiplexer 67 in accordance with the output value of the bit counter 66.

Thereafter, character patterns are successively generated in the same manner, while the image information at the 0th line thereof is being output. When the image information for one line has been completely output, the counters 61, 62 and 66 are reset by the line synchronization signal b which is output from the transmission control apparatus 3, whereby the counters 61, 62 and 66 are returned to their respective initial states.

On the other hand, the line counter 64 counts the line synchronization signal and designates the address of the next first line.

As a result, the image information at the first line in each character pattern is likewise output.

Thereafter, a similar operation is repeated and when the image information for one line at the 8th line has been completely output, the set pulse t is output from the line counter 64 in accordance with the next line synchronization signal b, whereby the flip-flop 51 of the change-over apparatus 5 is set. As a result, the relay 52 is switched and thereafter the change-over apparatus 5 outputs the image information $d_1$ which is output from the read apparatus 1.

Thus, the image information d output from the change-over apparatus 5 is input to the transmission control apparatus 3 and is then transmitted to the telephone line and, at the same time, the image information d is output to the image information extraction apparatus 4 in synchronization with the main scanning clock a, the line synchronization signal b and the subscanning clock c, which are output from the transmission control apparatus 3.

More specifically, the line synchronization signal b is first input to the image information extraction apparatus 4, so that the flip-flops 41 and 42 are reset.

The main scanning clock a and the subscanning clock c each, which are input to the image information extraction apparatus 4 after the line synchronization signal b, are reduced to ½ and are then output therefrom.

Therefore, the main scanning clock l, with alternate lines eliminated in the subscanning direction and with alternate bits eliminated in the main scanning clock a, is output from the AND gate 43.

Furthermore, the subscanning clock m, with alternate bits eliminated in the subscanning clock c, namely with alternate lines eliminated in the subscanning direction, is output from the AND gate 44.

On the other hand, the image information d output from the change-over apparatus 5, and the line synchronization signal b output from the transmission control apparatus 2 are directly output from the image information thin-out apparatus 6.

As a result, the signals d, l, b and m are input to the record apparatus 2 via the signal selection apparatus 7.

The record apparatus 2 performs the main scanning and subscanning in accordance with the main scanning clock l and the subscanning clock b, so that the image information d output from the change-over apparatus 5 is recorded, with alternate bits eliminated in both the main scanning direction and the subscanning direction by the record apparatus 2.

At this moment, with respect to the image information d for each line, which is output from the change-over apparatus 5, its top bit is output in synchronization with the line synchronization signal b, while the flip-flops 41 and 42 are reset by each line synchronization signal b, and the respective top bits of the main scanning clock 1 and the subscanning clock m are output in synchronization with the line synchronization signal b. Therefore, at any line, the image information is recorded, with the above-mentioned extraction, starting from the same main scanning position and the same subscanning position, so that there is no risk that the position of the image information may be shifted in any of the lines, so that properly-reduced monitor copies can be obtained.

The operation of the image information extraction apparatus 4 in FIG. 6 is the same as that of the image information extraction apparatus 4 in the embodiment that has been explained by referring to FIG. 1 through FIG. 4.

At reception, the image information i, the main scanning clock f, the line synchronization signal g and the subscanning clock h, which are output from the transmission control apparatus 3, are selected by the signal selection apparatus 7 and input to the record apparatus 2, whereby a copy of the same size as that of the original is obtained.

In the above-mentioned embodiment of a facsimile apparatus according to the present invention, the output k from the flip-flop 42 is applied to the AND gate 43, so that the main scanning clock l is obtained with alternate lines eliminated. Alternatively, the same monitor copy with a ¼ size reduction as that mentioned above can be obtained by causing the main scanning clock l to the output with alternate bits eliminated only in the main scanning direction, without applying the output k to the AND gate 43, and by having the record apparatus 2 record the image information in accordance with the main scanning clock l.

Furthermore, in the above-mentioned embodiments, size-reduced monitor copies are obtained by recording the image information which is output from the read apparatus 1, by the record apparatus 2 at transmission. However, such monitor copies can also be obtained by inutting image information to the record apparatus 2 via the image information extraction apparatus 4, from an image information storage apparatus, such as apparatus employing magnetic tapes, instead of from the read apparatus 1.

Furthermore, in the so far explained embodiments, image information is recorded, with alternate bits eliminated in both the main scanning direction and the subscanning direction. The present invention is not limited to that, since the number of bits to be eliminated can be selected as desired. If there is a risk that the image quality may be degraded by thinning out of the image information, due to the lack of image information, a logic for determining suitable input of the image information to the record apparatus 2 can be provided and set, taking into consideration the image quality of the reduced image information. For example, when the image information to be input to the record apparatus 2 is to be extracted, with alternate bits eliminated, the logic can be designed so as to use the average of each two successive bits.

In the embodiment shown in FIG. 6, the line counter 64 for selecting the line of a character pattern generated by the character pattern generator 65, and the bit counter 66 for causing the multiplexer 67 to output successively the image information of 8 bits in the line direction input thereto, are designed so as to perform their counting operation at the input of one bit of each of the subscanning clock c and the main scanning clock a. However, in case the identification information to be recorded on the reception side is too small in size, such inconvenience can be overcome by designing the line counter 64 and the bit counter 66 in such a manner that they perform their counting operation when two bits of each of the subscanning clock c and the main scanning clock a are input thereto.

Furthermore, in the present invention, conventional read apparatus and record apparatus, for instance, of the type which read and record each line, or of the type which read and record image information, a plurality of bits thereof each, in the subscanning direction can be employed. As the recording system, an electrostatic recording system or a thermosensitive recording system can be employed.

Each of the above-mentioned embodiments of a facsimile apparatus according to the present invention is of a transceiver type, which is provided with an image information read apparatus and an image information record apparatus and which is capable of transmitting and receiving image information. Therefore, the image information record apparatus can be used to make monitor copies at transmission, so that there is no necessity for providing a record apparatus for making monitor copies. However, in the case of a facsimile apparatus which is to be used exclusively for transmission, a record apparatus for producing monitor copies is required.

What is claimed is:

1. In a facsimile apparatus comprising an information read apparatus, a record apparatus and a transmission control apparatus, capable of transmitting and receiving image information, the improvement comprising an image-information extraction apparatus for extracting image information output from said image information read apparatus, at predetermined intervals, including means for coupling the extracted image information output to said image information record apparatus, thereby obtaining reduced monitor copies of the image information on record sheets while concurrently transmitting said image information to its counterpart facsimile apparatus serving as a receiving facsimile apparatus.

2. In a facsimile apparatus comprising an information read apparatus, a record apparatus and a transmission control apparatus, capable of transmitting and receiving image information, the improved comprising:
   an identification information generation circuit for generating identification information to be added to the image information read by said image information read apparatus;
   a change-over apparatus for outputting switchingly said identification information output from said identification information generation circuit and said image information output from said image information read apparatus; and
   an image information extraction apparatus for extracting said identification information and said image information output from said change-over apparatus, at predetermined intervals, including means for coupling the extracted output to said image information record apparatus, thereby yielding reduced monitor copies of the image information with said identification information added thereto on record sheets.

3. A facsimile apparatus as claimed in or claim 2, wherein said image information extraction apparatus comprises a first divider to which a main scanning clock is input, and a second divider to which a subscanning clock is input, said first divider and said second divider being reset by a line synchronization signal.

4. A facsimile apparatus as claimed in claim 3, wherein said first divider and said second divider each are a $\frac{1}{2}$ divider comprising a flip-flop circuit and an AND gate circuit.

5. A facsimile apparatus as claimed in claim 2, wherein said identification information generating apparatus comprises:
   a memory means for generating a character code whose address is designated in accordance with each predetermined bit of a main scanning clock;
   a character pattern generator for generating a character pattern in accordance with a character code from said memory means, the address of said character pattern being designated in accordance with each predetermined bit of a subscanning clock; and
   a multiplexer for successively outputting data of a predetermined number of bits in the line direction, one bit by one bit, which is output from said character pattern generator, in accordance with a bit address signal which is based on the main scanning clock.

6. A facsimile apparatus as claimed in or claim 2, wherein said record apparatus is employed for producing monitor copies and reduced monitor copies at transmission and for recording image information at reception.

7. In a facsimile apparatus comprising an information read apparatus, a record apparatus and a transmission control apparatus, capable of transmitting and receiving image information, the improvement comprising an image information extraction apparatus for extracting image information output from said image information read apparatus, at predetermined intervals, including means for coupling the extracted image information output to said image information record apparatus; said image information extraction apparatus comprising a first divider to which a main scanning clock is input, and a second divider to which a subscanning clock is input, said first divider and said second divider being reset by a line synchronization signal; thereby obtaining reduced monitor copies of the image information on record sheets.

8. In a facsimile apparatus comprising an information read apparatus, a record apparatus and a transmission control apparatus, capable of transmitting and receiving image information, the improvement comprising an image information extraction apparatus for extracting image information output from said image information read apparatus, at predetermined intervals, including means for coupling the extracted image information output to said image information record apparatus; said record apparatus being employed for producing monitor copies and reduced monitor copies at transmission and for recording image information at reception; thereby obtaining reduced monitor copies of the image information on record sheets.

* * * * *